US006935389B1

(12) United States Patent
Rinaldi

(10) Patent No.: US 6,935,389 B1
(45) Date of Patent: Aug. 30, 2005

(54) SELF-DEPLOYING FUNNEL

(76) Inventor: Mark Rinaldi, 418 Shore Dr. East, Oldsmar, FL (US) 34677

( * ) Notice: Subject to any disclaimer, the term of this patent is extended or adjusted under 35 U.S.C. 154(b) by 11 days.

(21) Appl. No.: 10/974,441

(22) Filed: Oct. 28, 2004

Related U.S. Application Data

(60) Provisional application No. 60/570,280, filed on May 12, 2004.

(51) Int. Cl.[7] .............................................. B65B 1/04
(52) U.S. Cl. ..................... 141/337; 184/1.5; 220/86.2
(58) Field of Search .............................. 141/331–345; 184/1.5; 220/86.2

(56) References Cited

U.S. PATENT DOCUMENTS 4,112,984 A * 9/1978 Guglia et al. ................. 141/98
5,894,872 A * 4/1999 Gale ........................... 141/368
6,397,907 B1 * 6/2002 Heintz ......................... 141/338
6,568,440 B1 * 5/2003 Engelbrecht ................. 141/338

* cited by examiner

*Primary Examiner*—Steven O. Douglas
(74) *Attorney, Agent, or Firm*—Stanley M. Miller

(57) ABSTRACT

A funnel assembly includes a collapsible funnel mounted to a base. The funnel is formed by consecutive windings of spring steel wire. Each winding has a reduced diameter so that the windings collectively form a funnel having a conical shape and an inherent bias. The funnel is confined into a relatively small storage space and the funnel is compressed when a cap releasably engages the base. Upon disengaging the cap from the base, the bias unloads and fully deploys the funnel. A downspout depends from the base and engages the fill spout of an oil crankcase so that the funnel assembly is mounted to the fill spout. A user therefore does not hold the funnel assembly while pouring oil from a can into the deployed funnel. By holding the base in one hand and the cap in the other, a user may deploy the funnel and return it to storage without touching the funnel.

7 Claims, 6 Drawing Sheets

SELF-DEPLOYING FUNNEL

CROSS-REFERENCE TO RELATED APPLICATIONS

This disclosure is a continuation-in-part of a provisional application filed by the present inventor on May 12, 2004, application No. 60/570,280, entitled "Self-Extracting Funnel."

BACKGROUND OF THE INVENTION

1. Field of the Invention

This invention relates, generally, to funnels of the type used in changing oil. More particularly, it relates to a funnel having a small, compact configuration when in storage and a larger, full size when fully deployed in an operative configuration.

2. Description of the Prior Art

Most manufacturers now recommend an oil change every five thousand miles instead of the previous recommendation of every three thousand miles. Still, re-filling the crankcase of an internal combustion engine with oil as a part of the oil change procedure is a messy task if the right equipment is not used. Most do-it-yourself methods require that an oil can be held in one hand and a funnel in the other during the charging process. This widely-practiced, well-known technique usually results in spilled oil, introduction of dirt, grime, or other debris into the crankcase, dirty clothes, and the like.

Dirt, grime, and other debris can enter into the crankcase, shortening engine life, because such materials usually accumulate around the oil fill cap and are easily knocked into the oil fill orifice by the hand-held funnel.

Oil spills often occur during such procedure, especially if the funnel is used in low light or other less-than-ideal conditions. If the engine is hot at the time a spill is made, a fire causing human injury can occur. Moreover, the engine can be rendered inoperable if such a fire damages the electrical wiring, the vacuum lines, the fuel lines, or the like.

Reusable funnels must be stored between uses, but such funnels are typically sold with no storage housing. Accordingly, the residual oil on such a funnel eventually drains from the funnel onto the surface where the funnel is stored. This results in the accumulation of dirt and grime to the extent that the funnel is unacceptably fouled by the time it is re-used.

Disposable funnels have drawbacks as well. They are typically made of a dense paper in a one-size-fits-all structure. They become saturated with oil after use. Thus, they should be disposed of as hazardous waste but most users place them in regular trash receptacles, to the detriment of the environment.

There exists a need for a non-disposable funnel that is stored in a clean container. The needed funnel should not require holding in one hand during an oil-changing procedure. Moreover, the needed funnel should not take up a large amount of space when in storage. It should also be constructed in such a way that a user need not touch the funnel when it is taken out of storage, used, and returned to storage.

However, in view of the prior art considered as a whole at the time the present invention was made, it was not obvious to those of ordinary skill in the pertinent art how such needs could be fulfilled.

SUMMARY OF THE INVENTION

The long-standing but heretofore unfulfilled need for an improved funnel that facilitates oil changes is now met by a new, useful, and nonobvious invention.

The novel funnel assembly includes a base having a bottom wall and sidewalls mounted about a periphery of the bottom wall that project upwardly therefrom. A cap includes a top wall and sidewalls mounted about the periphery of the top wall that depend therefrom.

The cap is adapted to releasably engage the base.

A collapsible funnel has a fully deployed configuration and a telescoped, storage configuration. The funnel has a conical shape and therefore has a wide upper end and a narrow lower end.

In a preferred embodiment, the funnel is made of consecutive windings of spring steel wire. The windings have a reduced diameter with each consecutive winding. The windings therefore collectively form a conical spring, thereby creating a funnel. The spring has two additional windings of equal diameter at the narrow diameter end of the funnel. The spring is encapsulated with rubber, or a rubber like material such as neoprene, thereby producing a collapsible, conical funnel.

A central aperture is formed in the bottom wall of the base. The narrow end of the funnel is mounted to the bottom wall of the base about the central aperture and the funnel projects upwardly therefrom when in its fully deployed configuration.

Alternatively, a groove is formed in the central aperture and the lowermost end of the funnel is secured within said groove by mechanical means, by an adhesive, or the like.

A downspout is formed integrally with the bottom wall of the base and is mounted to the bottom wall of the base about the central aperture. The downspout depends from the bottom wall of the base. The downspout has a lowermost end adapted to releasably engage a crankcase fill spout.

The funnel is in its telescoped configuration when the cap is engaged to the base and is in its fully deployed configuration when the cap is disengaged from the base.

The bias that self-deploys the funnel is provided by the consecutive windings of the spring steel wire of which the funnel is made. The spring steel wires are in repose when the funnel is deployed into its fully deployed configuration and the spring steel wires are loaded when the funnel is in its telescoped, storage configuration.

In a first embodiment, the sidewall of the base is adapted to be screwthreadedly engaged by the sidewall of the cap.

In a second embodiment, at least one generally "L"-shaped slot is formed in the sidewall of the base. The at least one generally "L"-shaped slot includes a vertical section, a circumferentially-extending section, and a truncate section parallel to the vertical section. A protuberance is formed on an interior wall of the sidewall of the cap and the protuberance is sized to slidingly engage the three sections of the "L"-shaped slot.

When the cap is used to compress the funnel, the protuberance is fully inserted into the first section of the slot. The cap is then rotated about its axis of rotation so that the protuberance enters into the second section of the slot and is fully inserted thereinto. The cap is then released so that the inherent bias of the funnel drives the protuberance to the top end of the third section of the slot, thereby releasably locking the cap onto the base.

The funnel is deployed by pressing the cap toward the base to drive the protuberance out of the third section of the slot, by then rotating the cap about its axis of rotation until the protuberance reaches the end of the second section of the slot, and then gradually removing the cap so that the protuberance slides to the top of the first section of the slot, so that the cap and base are disengaged from one another. The cap is gradually displaced further from the base and the funnel expands gradually, under the impulse of the inherent bias of the spring steel wire, into its fully deployed configuration.

In a third embodiment, a pair of catches is formed on an exterior sidewall of the base in circumferentially spaced apart relation to one another and a pair of latches is formed on an exterior side wall of the cap in circumferentially spaced relation to one another and in mating relation to the catches.

Each of the latches is apertured to receive an associated catch. Each latch is slightly pivotable about a transverse axis mid-length of each latch so that each latch can be disengaged from its associated catch by a squeezing action applied simultaneously to the opposed latches.

An important advantage of this invention is that it provides a funnel that remains clean when it is stored.

Another important advantage of the novel funnel is that it need not be held in one hand during an oil-changing procedure.

Another advantage is that the novel funnel occupies a small space when in storage yet deploys into its full size in the absence of being handled directly by the funnel user.

Still another advantage is that the novel funnel is never handled directly by a user during deployment, use, and storage, thereby keeping the user's hands and clothes clean throughout the entire oil-changing process.

Yet another advantage is that the funnel is made of a self-biasing material, thereby avoiding a need for a funnel and a separate bias means for deploying the funnel.

These and other important advantages and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
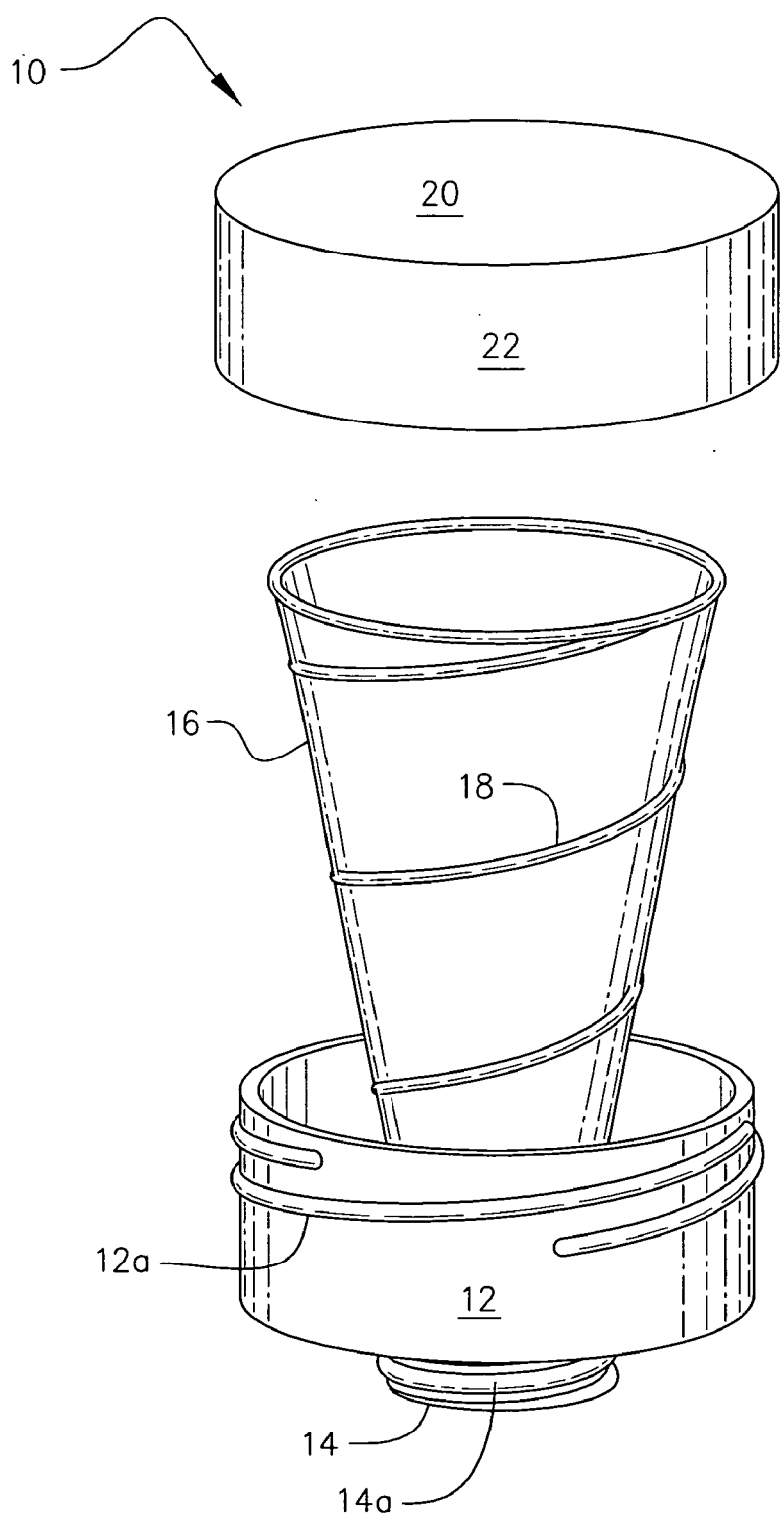
FIG. 1 is an exploded perspective view of a first embodiment of the invention when the funnel is fully deployed.
Figure 2:
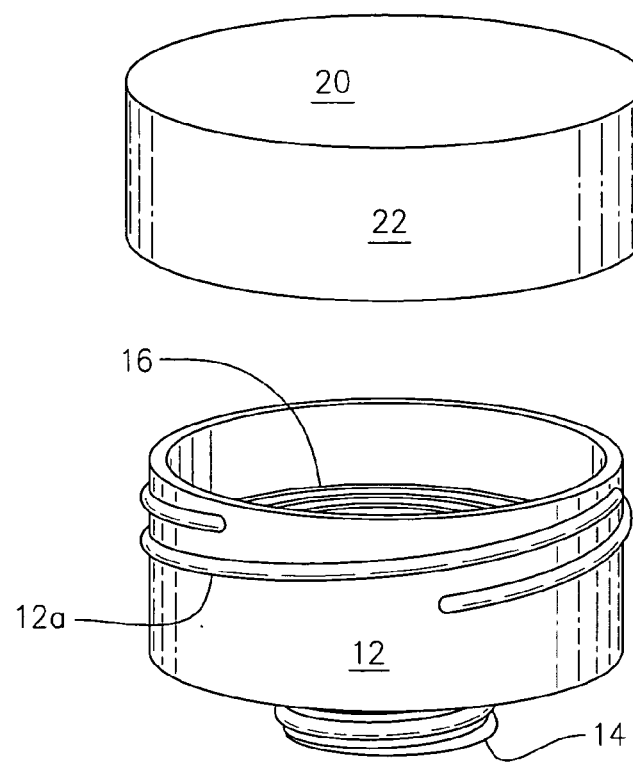
FIG. 2 is an exploded perspective view of the first embodiment when the funnel is in its undeployed configuration.
Figure 3:
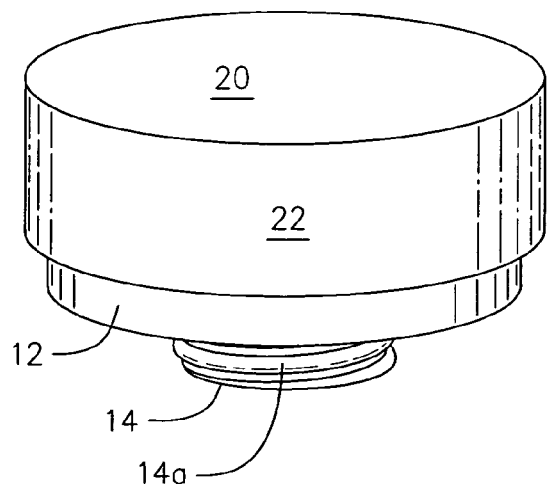
FIG. 3 is a perspective view of the first embodiment in its storage configuration.

Referring now to FIGS. 1–3, it will there be seen that the reference numeral 10 denotes an illustrative embodiment of the present invention as a whole.

Funnel assembly 10 includes base 12, downspout 14, funnel 16, helical and conical spring steel wires 18, and cap 20 having side wall 22 depending therefrom.

In the first embodiment of FIGS. 1–3, external helical threads 12a are formed about the circumference of base 12 and mating internal threads, not depicted, are formed in an interior surface of sidewall 22. This enables cap 20 to screw-threadedly engage base 12 in the manner depicted in FIG. 3. When in its FIG. 3 configuration, funnel 16 is in a collapsed, or telescoped configuration. Accordingly, when so contracted it occupies much less space than when in its fully deployed configuration as depicted in FIG. 1.

Significantly, when cap 20 is unscrewed from base 12, the user need not grasp funnel 16 to cause its deployment. Instead, helical and conical spring 18 is loaded when cap 20 is secured to base 12 and said spring 18 unloads when said cap is removed, thereby deploying funnel 16. Therefore it is said that funnel 16 is a self-deploying or self-extracting funnel. The user firmly grasps cap 20 and sidewall 22 as said cap is unscrewed so that said user may allow deployment of funnel 16 at a reasonable rate of deployment, i.e., cap 20 is not removed quickly to avoid an abrupt deployment of funnel 16.

Downspout 14 is depicted having external helical screw threads 14a but it should be understood that differing vehicles have differing types of closure means or caps for the oil-charging orifice. Accordingly, downspout 14 is manufactured in differing ways so that it may be adapted to connect to all oil-charging orifices in an air-tight way.

In the example of FIG. 1, external screwthreads 14a screwthreadingly engage internal screwthreads formed in the fill spout that terminates in the oil-charging orifice. In this way, downspout 14 is screwed into said fill spout and an airtight seal is achieved.

Significantly, such attachment of downspout 14 to such fill spout frees up the hands of the user after downspout 14 is engaged to said orifice. Accordingly, the user may use both hands to hold an oil can during the re-filling procedure if desired. The use of both hands helps ensure that the can will not be dropped and that the oil will not be spilled as it is poured into the funnel. If the user prefers to pour the oil from the can using one hand only, the second hand is free because it is not engaged in holding the novel funnel.

It is a simple matter to screw cap 20 onto base 12 when the procedure is finished. The user merely presses down on cap 20 with sufficient strength to overcome the inherent bias of funnel 16, thereby driving funnel 16 into its stored position inside base 12. The cap is rotated about its axis of rotation to accomplish the screwthreaded attachment of the cap to the base.

FIG. 3 depicts the novel assembly of parts when cap 20 is fully screwed onto base 12 so that funnel assembly 10 can be stored in a small space.

Note that the configuration of FIG. 2 is provided merely to show funnel 16 when in its collapsed, telescoped stored configuration. It should be understood that cap 20 must be used to drive said funnel into such depicted position and cap 20 must be secured to base 12 to hold said funnel in said loaded configuration, i.e., said stored configuration as depicted, with cap 20 in spaced apart relation to funnel 16, is not an actual configuration due to the inherent resiliency of the spring steel wires of which said funnel is made.

In this first embodiment, cap 20 is screwthreadedly engaged to base 12 as aforesaid but it should be clear that any other means for releasably securing cap 20 to base 12 is within the scope of this invention. It would be impractical to disclose or even list all of the known ways to releasably secure together two such objects. For example, the screwthreads could be obviated in favor of a press fit between cap 20 and base 12. A press fit would cost less to make, but it would be less reliable because spring 18 might overcome the press fit and propel cap 20 away from base 12 at a time that deployment of funnel 16 is not intended.

Accordingly, only two examples of other methods for releasably securing cap 20 to base 12 will be depicted.

Figure 4:
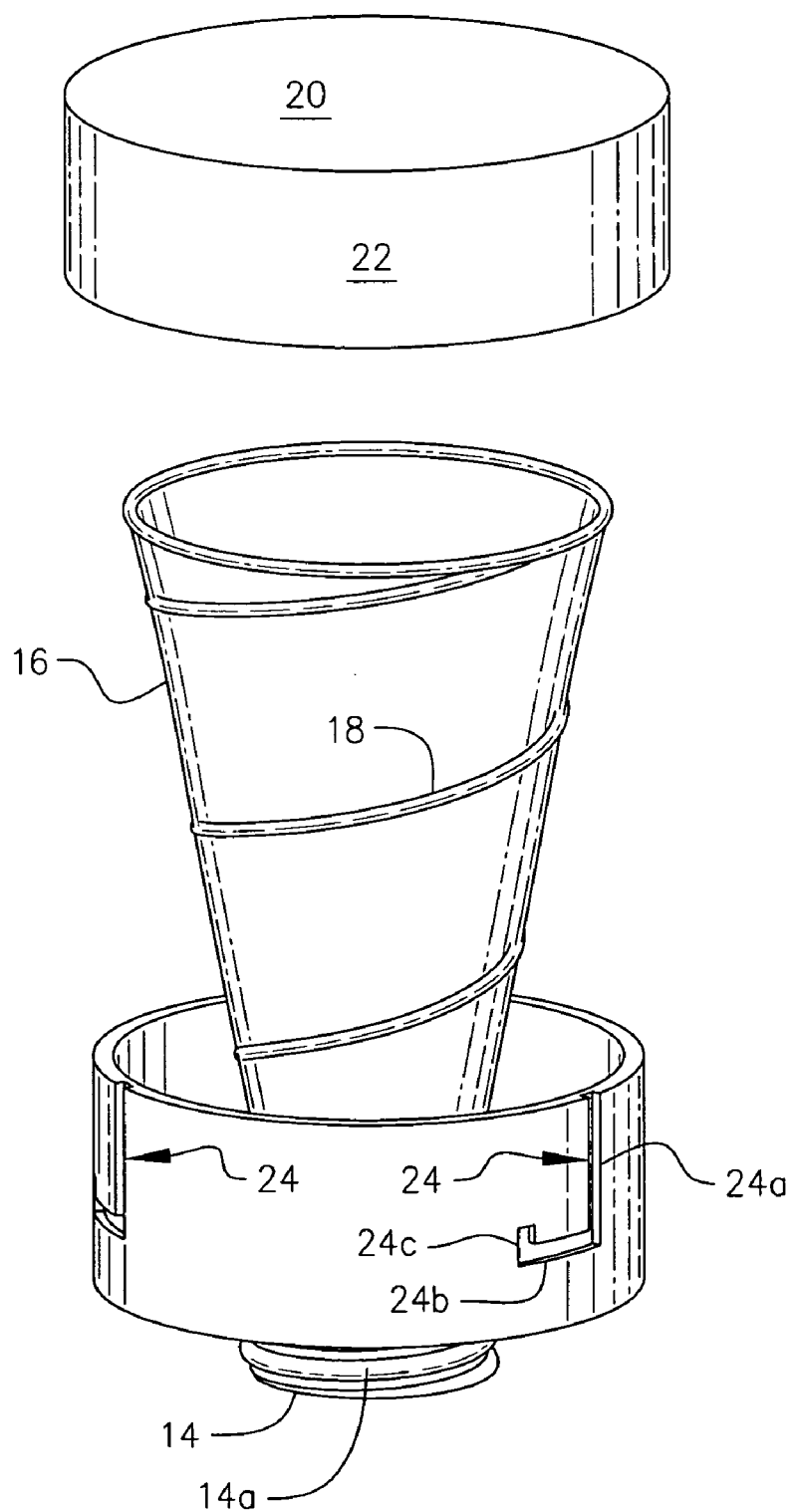
FIG. 4 is an exploded perspective view of a second embodiment of the invention when the funnel is fully deployed.
Figure 5:
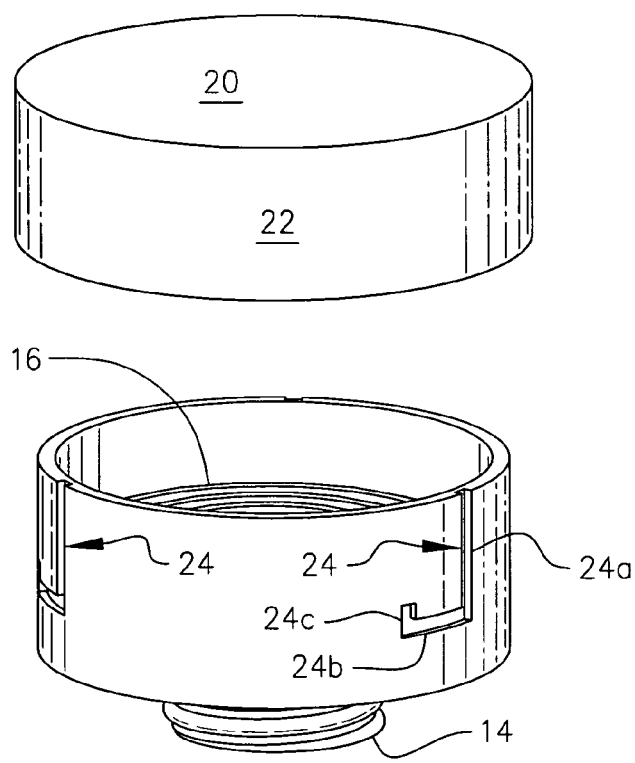
FIG. 5 is an exploded perspective view of the second embodiment when the funnel is in its undeployed configuration.
Figure 6:
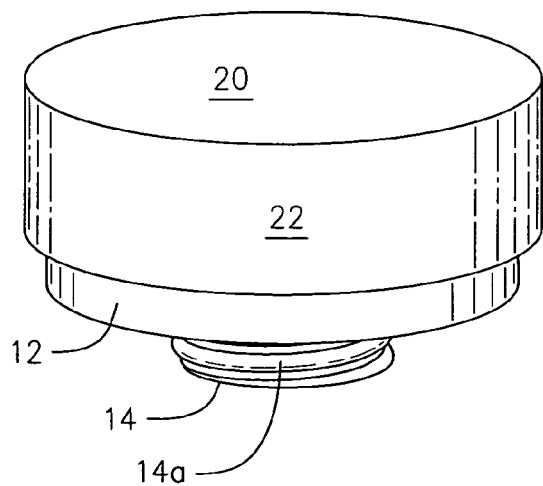
FIG. 6 is a perspective view of the second embodiment in its storage configuration.

The first alternative method for such releasable securement is depicted in the second embodiment of FIGS. 4–6. Known as a bayonet mount, this locking means includes a couple of "L"-shaped slots, collectively denoted 24, formed in base 12 in circumferentially spaced apart relation to one another. Each slot 24 includes a vertical section 24a, a circumferentially-extending section 24b, and a vertical, truncate section 24c. A protuberance, not shown, is formed on the interior wall of sidewall 22 of cap 20 and is sized to slidingly engage all three sections of "L"-shaped slot 24.

More particularly, cap 20 is used to compress funnel 16 as in the first embodiment, and the undepicted protuberance is inserted into section 24a until it bottoms out. Cap 20 is then rotated about its axis of rotation so that the undepicted protuberance enters into slot section 24b and reaches the end thereof. Cap 20 is then released and the inherent bias of funnel 16 drives the undepicted protuberance to the top end of slot section 24c, thereby releasably locking cap 20 onto base 12. This is the fully closed, storage position of the novel structure and is depicted in FIG. 6.

When funnel 16 is needed, cap 20 is pressed toward base 12 to drive the undepicted protuberance out of slot section 24c to the entrance of slot section 24b. Cap 20 is then rotated about its axis of rotation until the undepicted protuberance reaches the end of slot section 24b and the bottom entrance to slot section 24a. Cap 20 is then gradually removed so that funnel 16 expands gradually, under its inherent bias, into its fully deployed configuration as depicted in FIG. 4.

As explained in connection with the first embodiment, FIG. 5, like FIG. 2, depicts funnel 16 in its compressed or loaded position and the funnel would not remain in said position when cap 20 is separated from base 12 due to the inherent bias of said funnel.

Figure 7:
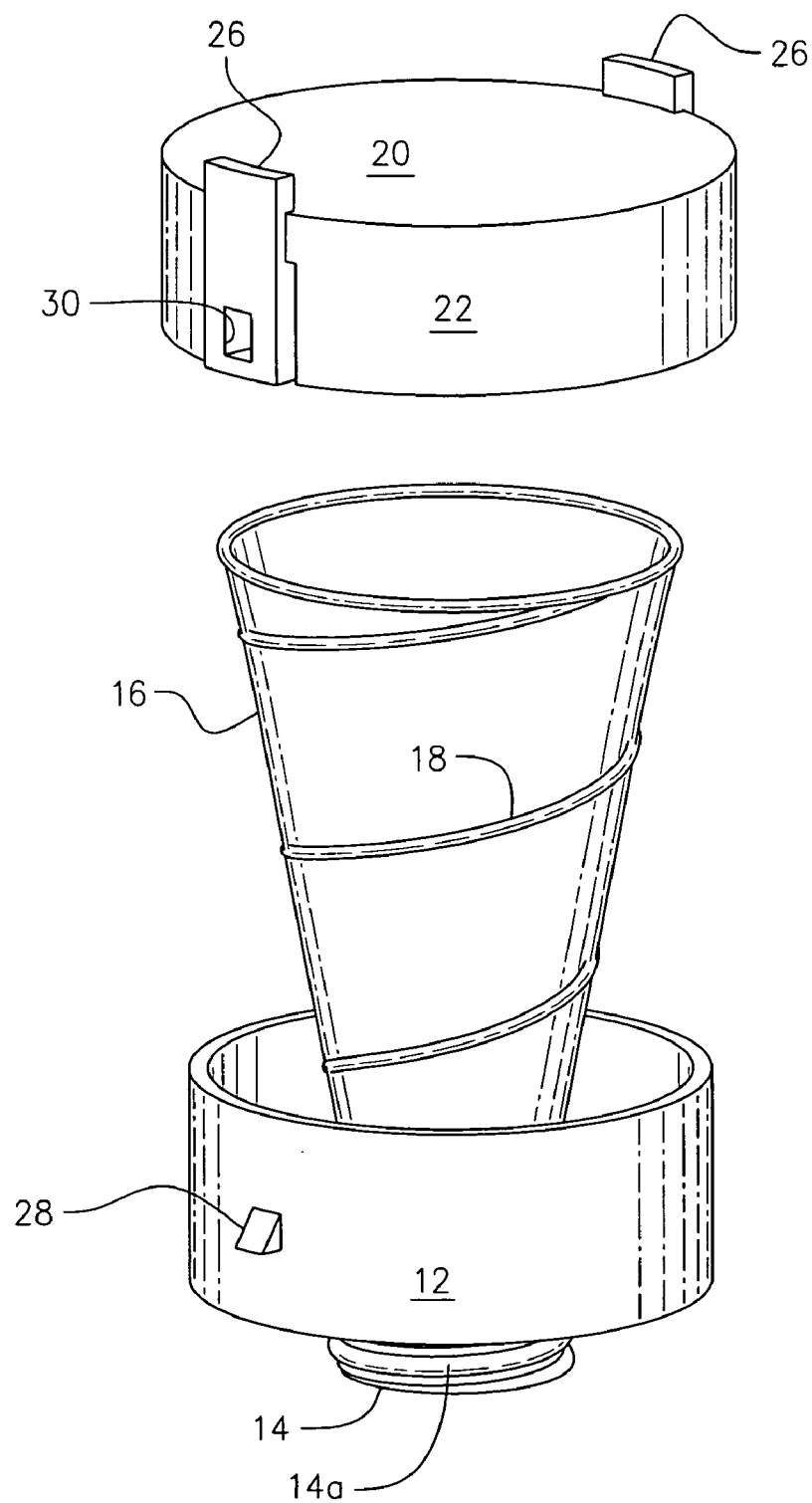
FIG. 7 is an exploded perspective view of a third embodiment of the invention when the funnel is fully deployed.
Figure 8:
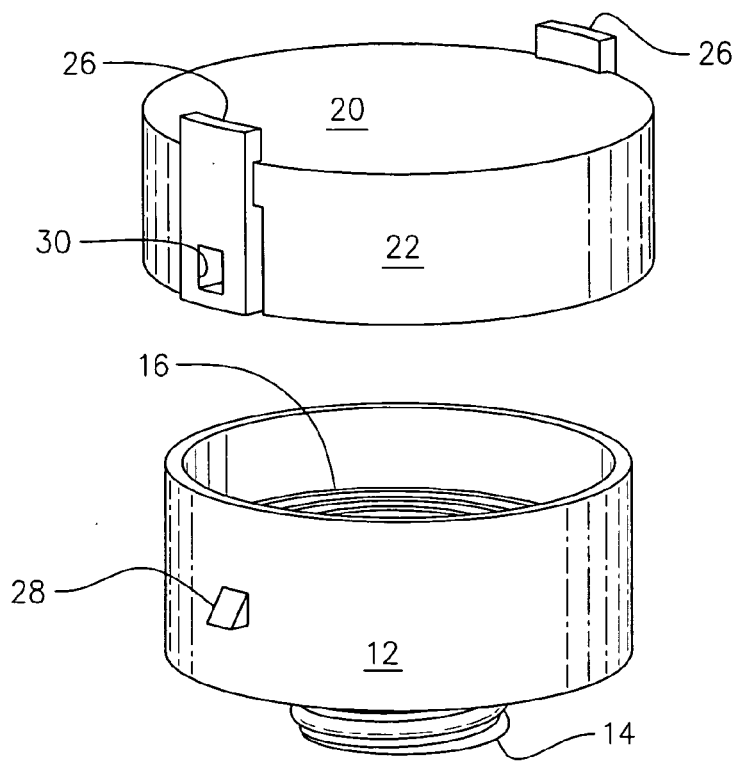
FIG. 8 is an exploded perspective view of the third embodiment when the funnel is in its undeployed configuration.
Figure 9:
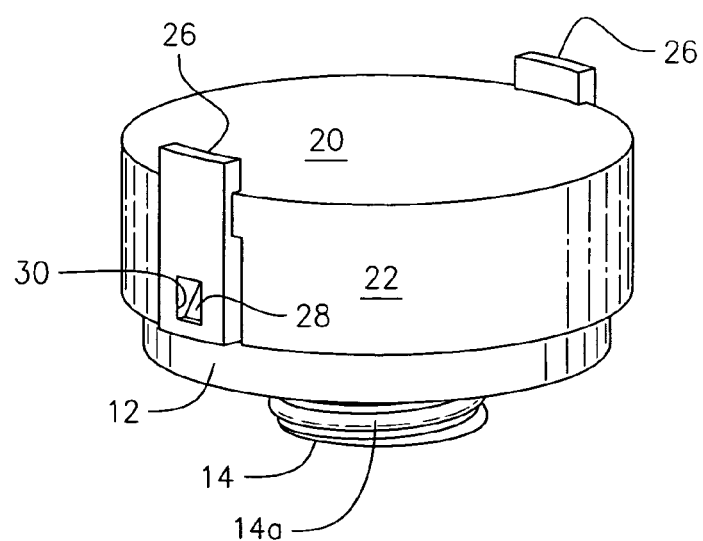
FIG. 9 is a perspective view of the third embodiment in its storage configuration.

A third embodiment of a means for releasably securing cap 20 to base 12 is depicted in FIGS. 7–9. A pair of catches, collectively denoted 26, is formed on an exterior sidewall of base 12 in diametrically opposed relation to one another. They may also be circumferentially spaced apart from one another in a relationship other than such diametric opposition. Only one of said catches 26 is fully visible in said Figs.

A pair of latches, denoted 28, that respectively mate with said catches 26, is formed on an exterior side wall of cap 20 in diametrically opposed relation to one another and in mating relation to the catches. Only one of said catches is visible in these views. Each latch 26 is apertured as at 30 to receive its associated catch 28. Each latch 26 is also slightly pivotable about a transverse axis mid-length of each latch so that each latch can be disengaged from its associated catch by a squeezing action applied simultaneously to the opposed latches as indicated by converging arrows 32a, 32b in FIG. 9.

Again, there are numerous ways to releasably engage cap 20 to base 12 and the invention is of course not limited to the few connection means depicted and described herein.

The novel funnel is stored inside structure 10 when not in use and no residual oil leaks from the structure. Placing the funnel into storage is accomplished by a simple manipulation of base 12 and cap 20 with no need to touch funnel 16. Deploying the funnel for use is just as easy and also does not require touching the funnel. Structure 10 is permanent and need not be discarded; this solves the problem associated with disposable funnels. Downspout 14 firmly lock onto the fill spout of the crankcase so that the user may handle the oil can with both hands if desired, thereby reducing spillage and lowering the level of effort required to accomplish an oil change. Still further advantages, not expressly mentioned, are realized as well.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,

What is claimed is:
1. A funnel assembly, comprising:
   a base including a bottom wall and sidewalls mounted about a periphery of said bottom wall and projecting upwardly therefrom;
   a cap including a top wall and sidewalls mounted about a periphery of said top wall and depending therefrom;
   said cap adapted to releasably engage said base;
   a collapsible funnel having a fully deployed configuration and a telescoped, storage configuration;
   said funnel having a conical shape including a wide upper end and a narrow lower end;
   a bias means associated with said funnel, said bias means being loaded when said funnel is in said storage configuration and said bias means being in repose when said funnel is in said deployed configuration;
   a central aperture formed in said bottom wall of said base;
   said funnel narrow end being mounted to said bottom wall of said base about said central aperture and said funnel projecting upwardly from said bottom wall when in its fully deployed configuration;
   a downspout formed integrally with said bottom wall of said base, said downspout being mounted to said bottom wall of said base about said central aperture and said downspout depending from said bottom wall of said base;
   said downspout having a lowermost end adapted to releasably engage a crankcase fill spout;
   said funnel being in said telescoped configuration when said cap is engaged to said base; and
   said funnel being in said fully deployed configuration when said cap is disengaged from said base.

2. The funnel assembly of claim 1, further comprising:
said bias means being formed by consecutive windings of spring steel wire having a reduced diameter with each consecutive winding, thereby forming said conical funnel.

3. The funnel assembly of claim 1, further comprising:
said bias means being encapsulated with rubber, or a rubber like material such as neoprene.

4. The funnel assembly of claim 1, further comprising;
said sidewall of said base adapted to be screwthreadedly engaged by said sidewall of said cap.

5. The funnel assembly of claim 1, further comprising:
at least one generally "L"-shaped slot formed in said sidewall of said base;
said at least one generally "L"-shaped slot including a vertical section, a circumferentially-extending section, and a truncate section parallel to said vertical section;
a protuberance formed on an interior wall of said sidewall of said cap;
said protuberance being sized to slidingly engage said three sections of said "L"-shaped slot;
whereby said cap is used to compress said bias means, said protuberance being fully inserted into said first section of said slot, said cap then being rotated about its axis of rotation so that said protuberance enters into said second section of said slot and is fully inserted thereinto, said cap then being released so that the bias of said bias means drives said protuberance to the top end of said third section of said slot, thereby releasably locking said cap onto said base;
whereby said funnel is deployed by pressing said cap toward said base to drive said protuberance out of said third section of said slot, by then rotating said cap about its axis of rotation until said protuberance reaches the end of said second section of said slot, and then gradually removing said cap so that said funnel expands gradually, under the impulse of said bias means, into its fully deployed configuration.

6. The funnel assembly of claim 1, further comprising:
a pair of catches formed on an exterior sidewall of said base in circumferentially spaced apart relation to one another;
a pair of latches formed on an exterior side wall of said cap in circumferentially spaced relation to one another and in mating relation to said catches;
each of said latches being apertured to receive an associated catch.

7. The funnel assembly of claim 6, further comprising:
each latch of said pair of latches being slightly pivotable about a transverse axis mid-length of each latch so that each latch can be disengaged from its associated catch by a squeezing action applied simultaneously to the opposed latches.

\* \* \* \* \*